United States Patent
Zha

(10) Patent No.: US 11,353,649 B2
(45) Date of Patent: Jun. 7, 2022

(54) DISPLAY DEVICE

(71) Applicant: WUHAN CHINA STAR OPTOELECTRONICS TECHNOLOGY CO., LTD., Hubei (CN)

(72) Inventor: Guowei Zha, Hubei (CN)

(73) Assignee: WUHAN CHINA STAR OPTOELECTRONICS TECHNOLOGY CO., LTD, Hubei (CN)

( * ) Notice: Subject to any disclaimer, the term of this patent is extended or adjusted under 35 U.S.C. 154(b) by 88 days.

(21) Appl. No.: 16/770,633

(22) PCT Filed: Oct. 16, 2019

(86) PCT No.: PCT/CN2019/111401
§ 371 (c)(1),
(2) Date: Jun. 8, 2020

(87) PCT Pub. No.: WO2020/228236
PCT Pub. Date: Nov. 19, 2020

(65) Prior Publication Data
US 2021/0382226 A1    Dec. 9, 2021

(30) Foreign Application Priority Data

May 16, 2019 (CN) .......................... 201910408806.7

(51) Int. Cl.
*F21V 8/00* (2006.01)
*G02F 1/1334* (2006.01)

(52) U.S. Cl.
CPC ......... *G02B 6/0091* (2013.01); *G02B 6/0068* (2013.01); *G02F 1/1334* (2013.01)

(58) Field of Classification Search
CPC .. G02B 6/0091; G02B 6/0068; G02B 6/0073; G02B 6/0066; G02B 6/0021; G02B 6/0095; G02B 6/009; G02F 1/1334
See application file for complete search history.

(56) References Cited

U.S. PATENT DOCUMENTS

2020/0160775 A1    5/2020    Zhang et al.

FOREIGN PATENT DOCUMENTS

| CN | 108254963 A | 7/2018 |
| CN | 108540603 A | 9/2018 |

(Continued)

OTHER PUBLICATIONS

CN_208384291_U_Electronic_Device machine translation.*

*Primary Examiner* — Joseph L Williams
*Assistant Examiner* — Jose M Diaz
(74) *Attorney, Agent, or Firm* — Soroker Agmon Nordman

(57) ABSTRACT

The invention provides a display device, including: a backlight module with a backlight area and a transmissive area; The transmissive area of the backlight module is disposed to have at least one MicroLED light emitting unit, when the microLED light emitting unit is turned on the backlight module, the camera module does not work, and the display area of the display panel and the transmissive display area are able to display the picture normally, thus entering the full-screen display state When the camera module is working, turn off the MicroLED light-emitting unit, the camera module obtains sufficient imaging light, and the display panel corresponding to the backlight area can display the picture normally.

15 Claims, 4 Drawing Sheets

(56) References Cited

FOREIGN PATENT DOCUMENTS

| | | |
|---|---|---|
| CN | 108666348 A | 10/2018 |
| CN | 208384291 U | 1/2019 |

\* cited by examiner

DISPLAY DEVICE

BACKGROUND OF INVENTION

Field of Invention

The invention relates to the field of display, and in particular to a display device.

Description of Prior Art

In the field of small and medium size display, a current focus and trend of research and development has been drawn to the so called full screen technology. That is the search of how to maximize the screen occupation ratio of human-computer interface through the development of related technologies. The first generation of full screen technology mainly focuses on the screen aspect ratios from 16:9 to 18:9 or greater, and the second generation technology of full screen is to further minimize the upper, lower, right, and left boundaries of a display, and even use flexible or foldable screen technology to maximize the visible area. Another research trend of the recent full screen technology is about how to further integrate the terminal fingerprint recognition, camera, facial recognition, range sensing, and other sensors into the display area of a display, to realize evolution of a pure display into a comprehensive perceptive and interactive interface.

Current mainstream display technologies include liquid crystal displays (LCDs) and organic light-emitting diodes (OLEDs). LCDs are a passive light-emitting technology, the brightness control of optical pixels is realized by an entire planar structured backlight module that irradiates the whole LCD box, while OLED technology is an active light-emitting technology using OLED pixels, and has benefits of relatively high contrast, light weighted, bendable, foldable, and others. On the other hand, because OLEDs are not provided with a backlight, they can be well suited for current optical fingerprint recognition modules, making the in-cell optical fingerprint recognition the current intrinsic unique advantage of OLEDs. Meanwhile, the industry is also developing an OLED-based solution of an in-screen camera, which allows a camera module to switch between a display mode and a camera mode, and is advantageous over a hallowed LCD solution where LCD sacrifices its display capability in a hollowed area for a camera module.

MicroLEDs as compared to OLED technology has similar active luminescence characteristics, and additionally beneficial features of high stability, high efficiency, longer life, higher brightness, smaller chip size, and longer response times inherent to LEDs which are advantageous over OLED, thus has become one of the key development trend in the display industry. However, compared with the traditional panel technology through etching and other "subtraction manufacturing" schemes, MicroLED mainly relies on yet technically matured "adding manufacturing" schemes. Especially, mass pixel transplant has been encountering innate low process yield and high cost challenges, and thus in the short term may face difficulties to become a really mature display technology.

Therefore, it is desired to propose a new display device, which can solve the problem of visible imperfection caused by the separation of a camera area and a display area in current technology, and realizes the real full screen technology.

SUMMARY OF INVENTION

Therefore, it is necessary to put forward a new display device, which can solve the problem of visual discontinuation caused by the separation of camera area and display area in the current technology, and realize a real full screen.

An objective of the invention is to provide a display device, which uses a backlight module that can provide different backlight schemes, enabling the display device to realize a full-screen display when the camera module is not working.

The invention provides a display device, comprising: a backlight module comprising a backlight area and a transmissive area, wherein at least one MicroLED light emitting unit is disposed on the transmissive area of the backlight module; a display panel disposed on one side of the backlight module; and a camera module disposed on the other side of the backlight module and corresponding to the transmissive area.

In particular, the backlight module comprises a lightguide plate on which a through hole is formed corresponding to the transmissive area. A transparent substrate is disposed in the through hole. The MicroLED light emitting unit is disposed on one side of the transparent substrate.

In particular, the backlight module further comprises a backlight source disposed on one side of the lightguide plate.

In particular, the backlight module comprises a glass substrate. The MicroLED light emitting unit is located on one side of the glass substrate and corresponds to the transmissive area.

In particular, the backlight module further comprises at least one MiniLED light-emitting unit. The MiniLED light-emitting unit is located on one side of the glass substrate and corresponds to the backlight area.

In particular, the MicroLED light emitting unit comprises a red light-emitting unit, a green light-emitting unit, and a blue light-emitting unit.

In particular, the red light-emitting unit, the green light-emitting unit, and the blue light-emitting unit are lit simultaneously. The red light-emitting unit, the green light-emitting unit and the blue light-emitting unit are lit in turn according to preset timing.

In particular, the display panel comprises a main display area and a transmissive display area. The main display area corresponds to the backlight area of the backlight module, and the transmissive display area corresponds to the transmissive area of the backlight module. When the MicroLED light-emitting unit of the backlight module is turned on, the camera module does not work, and the main display area and the transmissive display area of the display panel are able to display normally, and thus enter a full-screen display state. When the camera module is working, the MicroLED light-emitting unit is turned off, the display panel corresponding to the backlight area displays normally.

In particular, the display panel comprises a first substrate, a liquid crystal layer, and a second substrate. The liquid crystal layer is located on one side of the first substrate away from the backlight module. The second substrate is located on one side of the liquid crystal layer away from the first substrate.

In particular, in the transmissive display area, the liquid crystal molecule in the liquid crystal layer is a polymer network liquid crystal or polymer dispersion liquid crystal, the liquid crystal refresh frequency is in a range from 70 Hertz (Hz) to 80 Hz. In the main display area, the liquid crystal refresh frequency is in a range from 150 Hz to 200 Hz.

The beneficial effect of the present invention is: the present invention provides a display device. The display device is equipped with the backlight module under the transmissive area of the camera module. The backlight module may be a direct backlight module or an edge backlight module. The transmissive area is equipped with the MicroLED light emitting unit on the surface of the transparent substrate as the backlight of the transmissive area. Using the traditional die bonding, fitting process, the arrangement has the advantages of more technical maturity and lower cost. The MicroLED light emitting unit corresponds to the transmissive area, and since having small ship size can only occupy a very small proportion of the area, and maximize the transmittance of the light in the transmissive area, so as to ensure the transmittance required by the camera module, and improve the image display functionality. The transmissive requires only a small number of MicroLED to avoids the challenges of low yield and high cost associated with transfer of a large number of MicroLED light emitting units.

BRIEF DESCRIPTION OF DRAWINGS

To clear disclose the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF PREFERRED EMBODIMENTS

Figure 1:
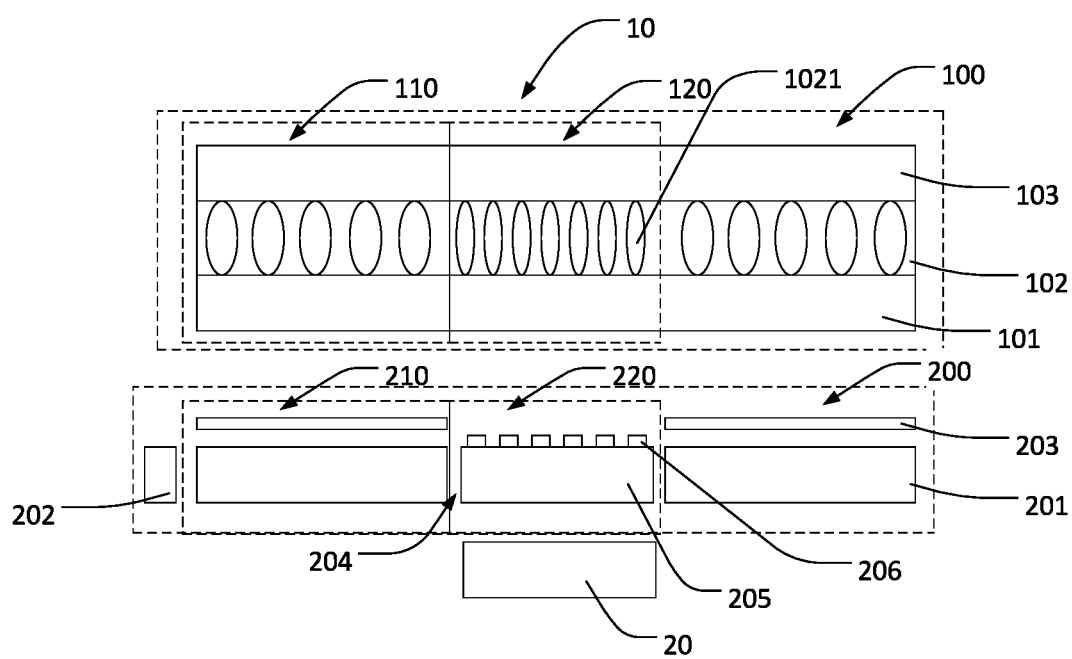
FIG. 1 is a structural view showing a display device of an embodiment of the invention.

The following is the illustrative description of the present invention which can be implemented with specific embodiments accompany with the drawings. The directional terms mentioned in the present invention, such as top, bottom, front, back, left, right, interior, exterior, side, and the similar are only the directions in the drawings. The names of components mentioned in the present invention, such as the first and second, are only to distinguish between different parts, which can be better renamed. In the drawings, elements with similar structures are represented by the same label.

This article details embodiments of the present invention with reference to the drawings. The present invention may be manifested in many different forms, and should not be only interpreted as specific embodiments described herein. The embodiments are provided to explain the practical application of the present invention, for better understanding by a person with ordinary skills in the art various embodiments of the present invention and various modifications suitable for particular expected applications.

As shown in FIG. 1, an embodiment of the present invention provides a display device 10 including a backlight module 200, a display panel 100, and a camera module 20.

The display panel 100 comprises a first substrate 101, a liquid crystal layer 102, and a second substrate 103.

The first substrate 101 is a thin-film transistor (TFT) array substrate and the second substrate 103 is a color film substrate.

The liquid crystal layer 102 is located on one side of the first substrate 101 away from the backlight module 200, and the second substrate 103 is located on one side of the liquid crystal layer 102 away from the first substrate 101.

The backlight module 200 has a backlight area 210 and a transmissive area 220. The backlight module 200 is an edge backlight module. In the transmissive area 220, the transmittance of the backlight module 200 is 50% to 100%. Higher transmittance of the backlight module 200 is preferred.

The backlight module 200 comprises a lightguide plate 201, a backlight source 202, and a backlight film layer 203.

The lightguide plate 201 has a through-hole 204. The through-hole 204 corresponds to the transmissive area 220. The through-hole 204 is equipped with a transparent substrate 205. The transparent substrate 205 can increase transmittance of the transmissive area 220. The transparent substrate 205 is a microLED substrate.

Figure 2:
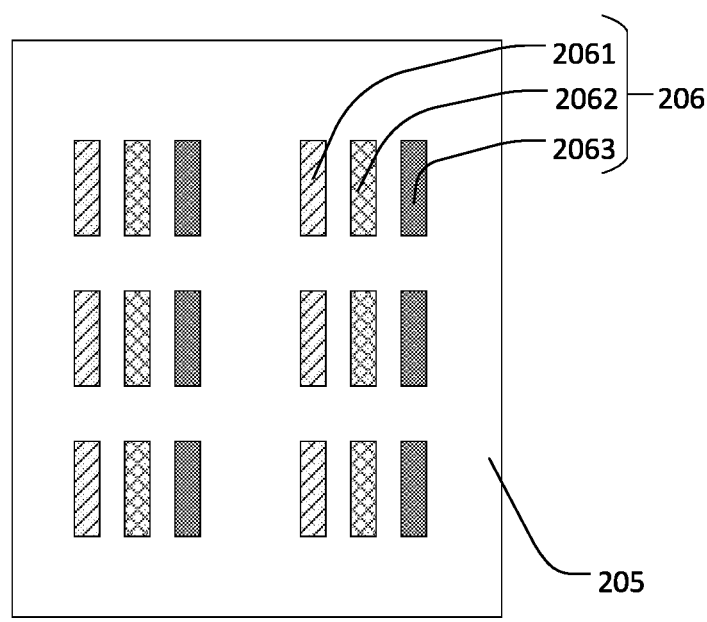
FIG. 2 is a planar view showing a normally illuminated mMicroLED light-emitting unit of an embodiment of the invention.

As shown in FIG. 2, a number of MicroLED light-emitting units 206 are disposed on the transparent substrate 205. A MicroLED light-emitting unit 206 comprises a red light-emitting unit 2061, a green light-emitting unit 2062 and a blue light-emitting unit 2063.

The MicroLED light-emitting units 206 are distributed as an array on the transparent substrate 205. The MicroLED light-emitting units 206 may be welded to the transparent substrate 205 through chip-level welding technology, also known as chip bonding.

The MicroLED light-emitting units 206 is each arranged in the order of a blue light-emitting unit 2063, green a light-emitting unit 2062, and a red light-emitting unit 2061. In other embodiments, it can also be in the order of red light-emitting unit 2061, green light-emitting unit 2062, and blue light-emitting unit 2063.

With a very small chip size, MicroLEDs can occupy only a very small proportion of a display area to maximize the transmittance of the transmissive area 220, so as to ensure that transmittance of the camera module 20 and reduce the impact on the display quality. The density of the MicroLED light-emitting units 206 can be 100 PPI, 300 PPI, 500 PPI, 700 PPI, or any PPI in a range of 10 PPI to 800 PPI, while 200 PPI is preferable.

In addition, the backlight area 210 of the backlight module 200 needs a very small number of the MicroLED light-emitting units 206, thus avoiding challenges of low yield and high cost that comes with by mass transfer of MicroLED light-emitting units 206.

If the camera module 20 requires a low transmittance for the transmissive area 220, the MicroLED light-emitting units 206 may be lit in a normal lighting manner, that is, with a red light-emitting unit 2061, green light-emitting unit 2062 and blue light-emitting unit 2063 disposed in the transmissive area 220, to turn on the light-emitting units of three colors simultaneously whenever requested.

Figure 3:
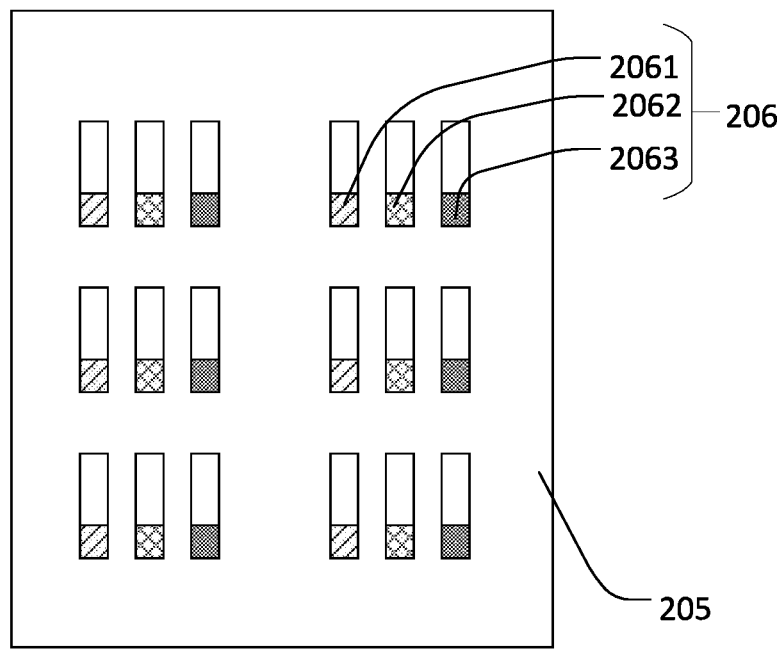
FIG. 3 is a planar view showing a sequentially illuminated mMicroLED light-emitting unit of an embodiment of the invention.

As shown in FIG. 3, if the camera module 20 requires a higher transmittance for the transmissive area 220, the MicroLED light-emitting units 206 is lit in order, that is, to lighten the light-emitting units of three colors in turn or sequentially with a one-third duty ratio according to preset timing, and accordingly to achieve color display in the transmissive area.

The sequential lighting mainly increases transmissive area and the transmittance of the transmissive area 220, and improves camera capability of the camera module 20.

The backlight source 202 is located on an edge of the lightguide plate 201, the backlight film layer 203 is located on the lightguide plate 201 and corresponds to the backlight area 210. The material of the backlight film layer 203 may be white reflective ink or color resist, which can increase the backlight efficiency of the backlight structure.

The display panel 100 is located on the backlight module 200, and the camera module 20 is located under the backlight module 200 and corresponds to the transmissive area 220.

The display panel 100 comprises a main display area 110 and a transmissive display area 120. The main display area 110 corresponds to the backlight area 210 of the backlight module 200, and the transmissive display area 120 corresponds to the transmissive area 220 of the backlight module 200.

When the MicroLED light-emitting units 206 of the backlight module 200 is turned on, the camera module 20 does not work, while the main display area 110 and the transmissive display area 120 of the display panel 100 can display images normally, thus entering a full-screen display state.

When the camera module 20 is working, the MicroLED light-emitting units 206 are turned off, the camera module 20 obtains sufficient light for imaging, and an area of the display panel 100 to which the backlight area 210 corresponding can display images normally.

In the transmissive display area 120, the liquid crystal molecules 1021 in the liquid crystal layer 102 are polymer network liquid crystal (PNLC) or polymer dispersed liquid crystal (PDLC). The liquid crystal layer 102 does not have top-bottom structured polarizers, and the liquid crystal layer 102 has no RGB color resist, thus to maximize transmittance of the transmissive display area 120. The transmissive display area 120 operates in normal black or normal white mode.

The liquid crystal layer 102 is generally in a normal black mode. The transmissive area 120 when not applied with voltage, due to the scattering function of polymer dispersion liquid crystal, causes light beams of the backlight light to be blocked by the scattering function, and thus appears as "black mode", but when applied with voltage, causes the liquid crystal to be arranged uniformly, and accordingly obtains transparency by maximizing the transmittance.

In the transmissive area 120, the liquid crystal refresh frequency can be 55 Hertz (Hz), 65 Hz, or another value in a range from 50 Hz to 70 Hz while 60 Hz is preferred. In the main display area 110, the liquid crystal refresh frequency may be 160 Hz, 170 Hz, 190 Hz, or another value in a range from 150 Hz to 200 Hz while 180 Hz is preferred.

This makes the liquid crystal refresh frequency match the sequential lighting of the MicroLED light-emitting units 206, and enables synchronous display in the transmissive display area and the main display area 110, and thus achieves a truly full screen technology.

Figure 4:
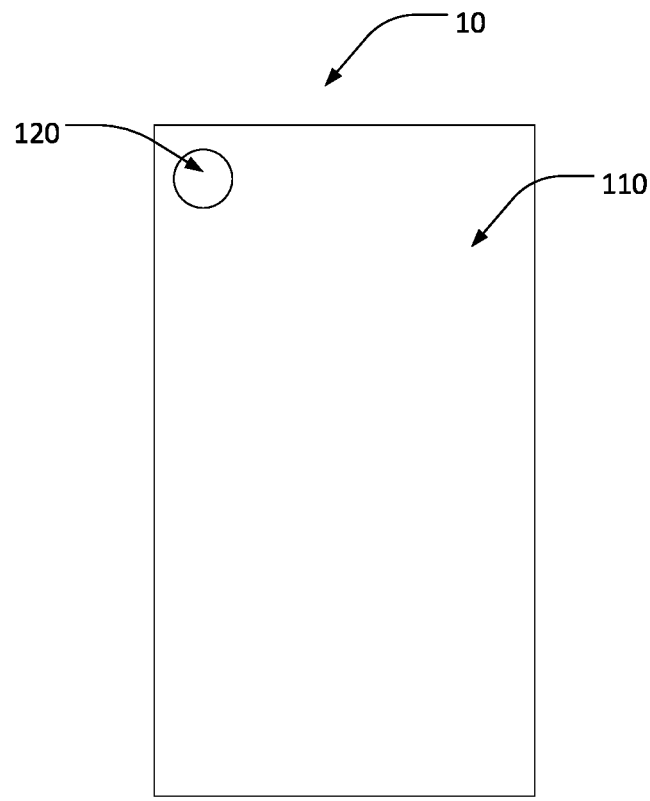
FIG. 4 is a structural view showing a circular screen of the display device of an embodiment of the invention.
Figure 5:
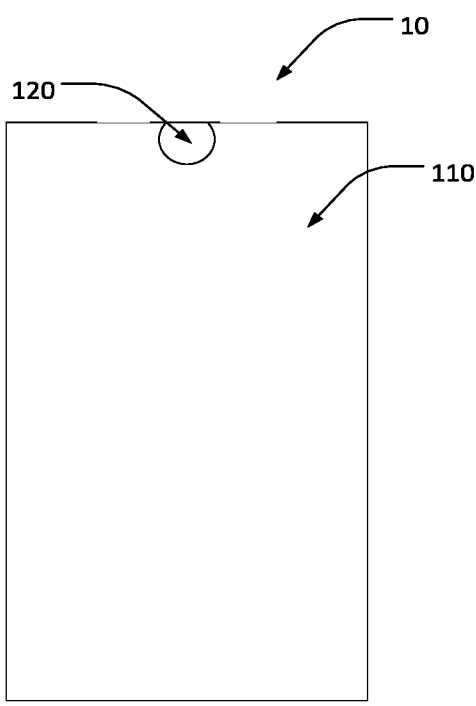
FIG. 5 is a structural view showing a water drop screen of the display device of an embodiment of the invention.
Figure 6:
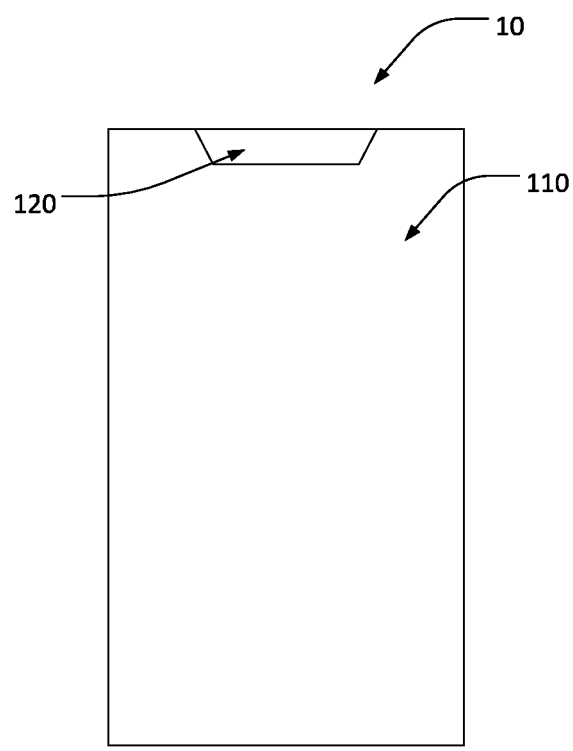
FIG. 6 is a structural view showing a notch-shape screen of the display device of an embodiment of the invention.

The shape of the transmissive display area 120 described in the invention may include but not limited to a round hole shape (as shown in FIG. 4), or a "water droplet" shape (as shown in FIG. 5), a "notch" shape (as shown in FIG. 6), or a "widow's peak" shape.

Figure 7:
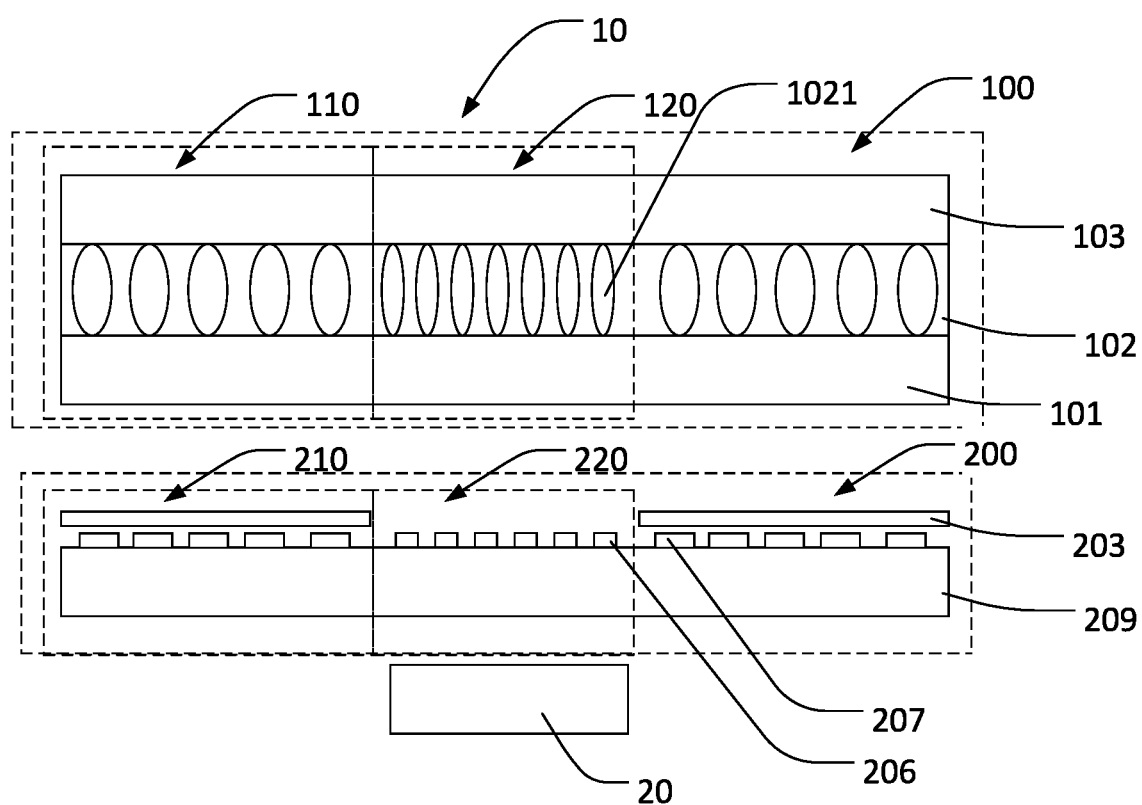
FIG. 7 is a structural view showing a display device of alternative embodiment of the invention.

As shown in FIG. 7, the present invention also provides another embodiment, which differs from one embodiment in that the backlight module 200 is a module of direct backlight which may further improve backlight efficiency of the display device 10.

The backlight module 200 comprises a glass substrate 209, MiniLED light-emitting units 207, and a backlight film layer 203.

The glass substrate 209 has a high light transmittance. The MiniLED light-emitting units 207 are located on the glass substrate 209 and corresponds to the backlight area. The backlight film layer 203 is located on the MiniLED light-emitting unit 207 of the backlight area 210. The MiniLED light-emitting unit 207 and the MicroLED light-emitting units 206 are disposed on the same layer.

The invention provides a display device 10 using a camera module 20 under a backlight module associated with the backlight area.

The backlight module 200 may be a module of direct backlight or edge backlight. The transmissive area 220 has MicroLED light-emitting units 206 located on a surface of the transparent substrate 205 as the backlight of the transmissive area 220. Using the traditional die bonding, fitting process, the arrangement has the advantages of more technical maturity and lower cost. The MicroLED light emitting unit corresponds to the transmissive area, and since having small ship size can only occupy a very small proportion of the area, and maximize the transmittance of the light in the transmissive area, so as to ensure the transmittance required by the camera module, and improve the image display functionality. The transmissive requires only a small number of MicroLED to avoids the challenges of low yield and high cost associated with mass transfer of a large number of MicroLED light emitting units.

The liquid crystal layer 102 uses a transparent display scheme without color resist based on PDLC or PNLC in the transparent display area, which also maximizes the transmittance of the transmissive display area 120.

When the MicroLED light-emitting units 206 of the backlight module 200 is turned on, the camera module 20 does not work, and the display area of the display panel 100 and the transmissive display area 120 are able to display the picture normally, thus entering the full-screen display state.

When the camera module 20 is working, the MicroLED light-emitting units 206 are turned off, the camera module 20 obtains sufficient imaging light, the backlight area 210 corresponding to the display panel 100 can display the picture normally.

The invention is not limited to the detailed description. It shall be noted that a person with ordinary skills in the art without departing from the principles of the present invention, may also make certain improvements and modifications, which should be also regarded as in the claims of the present invention.

What is claimed is:

1. A display device, comprising:
   a backlight module comprising a backlight area and a transmissive area, wherein at least one MicroLED light emitting unit is disposed on the transmissive area of the backlight module;
   a display panel disposed on one upper side of the backlight module, wherein the display panel comprises a main display area and a transmissive display area, the main display area corresponds to the backlight area of the backlight module, and the transmissive display area corresponds to the transmissive area of the backlight module; and a camera module disposed on the other side of the backlight module and corresponding to the transmissive area;

wherein the at least one MicroLED light emitting unit is distributed and formed as an array on a portion of a first transparent substrate located in the transmissive area of the backlight module;

the camera module is located under the first transparent substrate and aligned with the transmissive area of the backlight module; and the at least one MicroLED light emitting unit in the transmissive area only occupies a minor proportion of the transmissive area to provide transmittance required by the camera module.

2. The display device of claim 1, wherein the backlight module comprises:

a lightguide plate on which a through hole is formed corresponding to the transmissive area;

wherein a second transparent substrate is disposed in the through hole, and the MicroLED light emitting unit is disposed on one side of the second transparent substrate.

3. The display device of claim 2, the backlight module further comprises:

a backlight source disposed on one side of the lightguide plate.

4. The display device of claim 1, wherein the backlight module comprises:

a glass substrate, wherein the MicroLED light emitting unit is located on one side of the glass substrate and corresponds to the transmissive area.

5. The display device of claim 4, wherein the backlight module further comprises:

at least one MiniLED light-emitting unit, wherein the MiniLED light-emitting unit is located on one side of the glass substrate and corresponds to the backlight area.

6. The display device of claim 1, wherein the MicroLED light emitting unit comprises a red light-emitting unit, a green light-emitting unit, and a blue light-emitting unit.

7. The display device of claim 6, wherein the red light-emitting unit, the green light-emitting unit, and the blue light-emitting unit are lit simultaneously; or the red light-emitting unit, the green light-emitting unit and the blue light-emitting unit are lit sequentially according to preset timing.

8. The display device of claim 1, wherein when the MicroLED light-emitting unit of the backlight module is turned on, the camera module does not work, and the main display area and the transmissive display area of the display panel are able to display normally, and enter a full-screen display state; and when the camera module is working, the MicroLED light-emitting unit is turned off, the display panel corresponding to the backlight area displays normally.

9. The display device of claim 8, wherein the display panel comprises:

a first substrate;

a liquid crystal layer located on one side of the first substrate away from the backlight module; and a second substrate located on the side of the liquid crystal layer away from the first substrate.

10. The display device of claim 9, wherein in the transmissive display area, liquid crystal molecule in the liquid crystal layer is polymer network liquid crystal or polymer dispersion liquid crystal, and a liquid crystal refresh frequency is in a range from 70 Hz to 80 Hz; and in the main display area, a liquid crystal refresh frequency is in a range from 150 Hz to 200 Hz.

11. The display device of claim 9, wherein liquid crystal refresh frequency of a liquid crystal display (LCD) in the liquid crystal layer is configured for matching sequential lighting of the MicroLED light-emitting unit to enable synchronous display in the transmissive display area and the main display area.

12. The display device of claim 9, wherein the liquid crystal layer has no RGB color resist.

13. The display device of claim 1, wherein a projection of the camera module on the first transparent substrate is in the transmissive area of the backlight module.

14. The display device of claim 1, wherein the MicroLED light-emitting unit has a resolution ranging from 10 pixels per inch (PPI) to 800 PPI.

15. The display device of claim 1, wherein the MicroLED light-emitting unit is formed on the first transparent substrate through chip-level welding technology or chip bonding.

* * * * *